United States Patent [19]

Poznick et al.

[11] Patent Number: 6,102,771
[45] Date of Patent: Aug. 15, 2000

[54] TOY VEHICLE HAVING MOTOR-DRIVEN CONVERTIBLE TOP

[75] Inventors: Jeffrey B Poznick, La Crescenta; Manuel Goy, Santa Ana, both of Calif.

[73] Assignee: Mattel, Inc., El Segundo

[21] Appl. No.: 09/133,757

[22] Filed: Aug. 13, 1998

[51] Int. Cl.[7] .......................... A63H 17/00; A63H 17/26; A63H 17/273; B60J 7/00
[52] U.S. Cl. ...................... 446/465; 446/470; 296/107.17
[58] Field of Search ................................... 446/471, 470, 446/465, 487; 296/107.17

[56] References Cited

U.S. PATENT DOCUMENTS

| D. 356,757 | 3/1995 | Lagaay et al. . | |
|---|---|---|---|
| 1,973,220 | 9/1934 | Mohr . | |
| 2,181,869 | 12/1939 | Carr | 296/107.17 |
| 2,471,378 | 5/1949 | Shilala | 296/107.17 |
| 3,536,354 | 10/1970 | Ingram . | |
| 3,583,095 | 6/1971 | Fahrendorff . | |
| 3,939,605 | 2/1976 | Allen . | |
| 4,083,143 | 4/1978 | Allen . | |
| 4,490,939 | 1/1985 | Kennedy et al. . | |
| 5,055,082 | 10/1991 | Varner . | |
| 5,106,150 | 4/1992 | Litwicki . | |

*Primary Examiner*—Robert A. Hafer
*Assistant Examiner*—Laura Fossum
*Attorney, Agent, or Firm*—Roy A. Ekstrand

[57] ABSTRACT

A toy vehicle includes a body supported by a plurality of rolling wheels and a front windshield. A trunk lid is pivotally supported at the rear of the vehicle body and is spring biased toward a closed position. A convertible top is pivotally supported by the vehicle and defines a curved upper surface and a rear window surface. A sector gear is joined to the convertible top and is pivotable therewith. A power drive unit includes a motor and plurality of coupling gears which couple motor power to the sector gear. A battery power source and a plurality of on/off switches are operatively coupled to the motor and battery power source to induce energizing of the motor. The convertible top may be either raised or lowered by energizing the drive motor in an action in which the outer surface of the convertible top provides a cam-like member forcing the trunk lid open to facilitate lowering the convertible top into the body or raising it from the body interior.

6 Claims, 2 Drawing Sheets

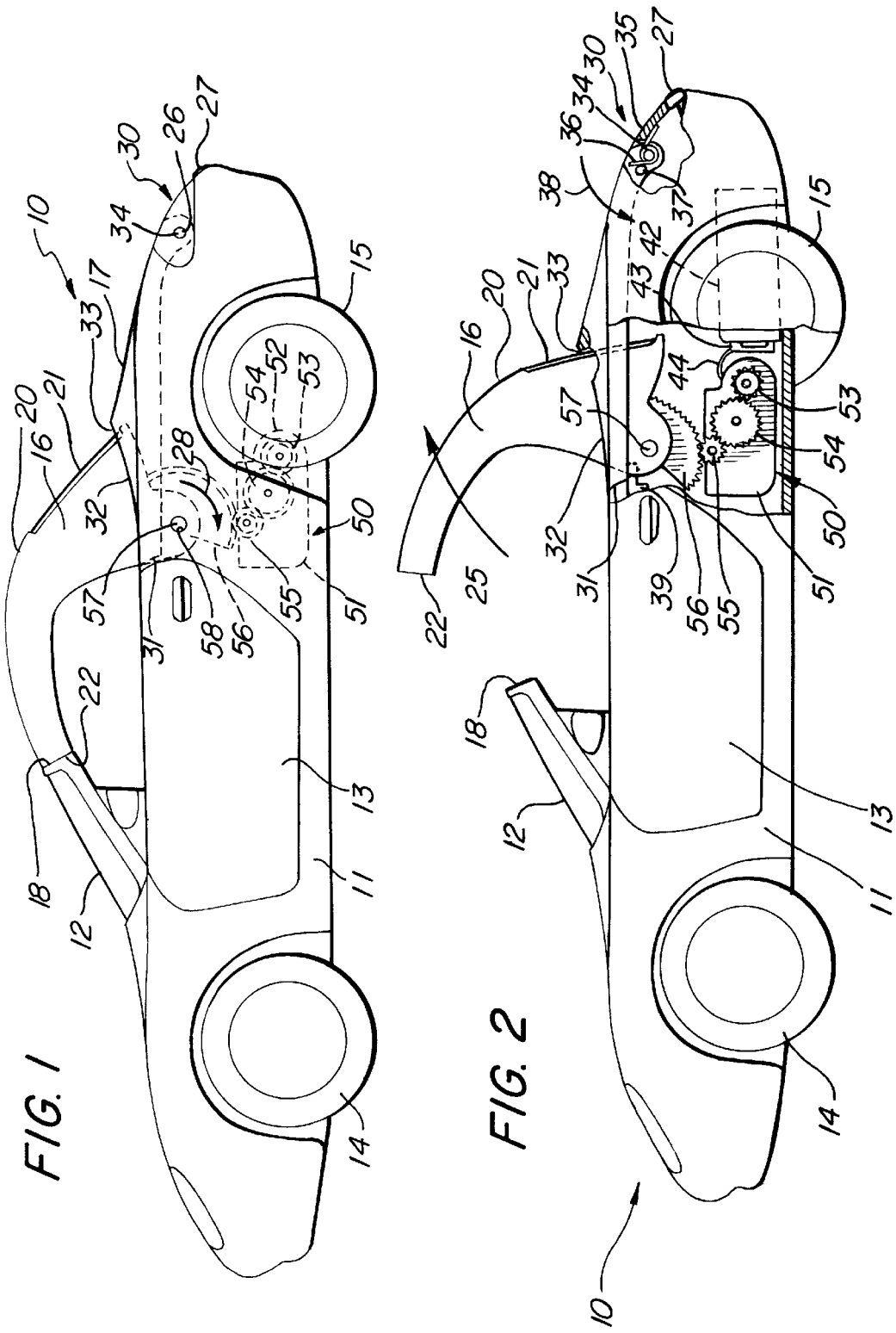

TOY VEHICLE HAVING MOTOR-DRIVEN CONVERTIBLE TOP

SPECIFICATION

1. Field of the Invention

This invention relates generally to toy vehicles and particularly to those having a retractable convertible top.

2. Background of the Invention

Toy vehicles have proven to be an extremely long lasting and highly popular class of toys. Through the years, toy vehicles have been provided which appeal to virtually every age group extending from very young children to adults. As a result, practitioners in the toy art have provided a substantial variety of toy vehicles. In their simplest form, toy vehicles are, in essence, miniature replicas of an actual existing vehicle or a fanciful depiction of an imaginary vehicle or the like. Such simple replica type cars are unpowered and freely rolled upon their supporting wheels. A variation of replica toy vehicles is found in the vehicles which are directed toward serious enthusiasts and collectors. Such replica vehicles are very detailed and often fabricated to provide movable parts such as trunk lids, doors, hoods, steering wheels, and so on.

Another type of toy vehicle which has proven very long lasting and popular is found in toy vehicles having a self-propelled device therein. For example, toy vehicles have been provided which support batteries and motors together with drive apparatus for propelling the vehicle. Earlier propelled vehicles used power sources having either spring windup devices or inertia driven flywheel type power supplies.

With the advent of relatively low cost electronic systems, practitioners in the toy art have provided a variety of toy vehicles which are controlled by a remote transmitter using energy transmitted to the vehicle in the form of radio frequency waves, infrared light, or ultrasound. A further variant of toy vehicles arises in vehicles having an operational character. Such vehicles are capable of producing effects such as light and/or sound. In such vehicles there is often provided sound producing engines which vibrate when running, vehicle lights such as headlight and tail lights, a working horn, and a sound circuit capable of producing a variety of automobile sounds such as screeching tires.

In still other toy vehicles, a convertible top is provided which is capable of being raised to a position covering the cockpit or lowered to a retracted position. For example, U.S. Pat. No. 4,490,939 issued to Kennedy et al sets forth a HARD TOP CONVERTIBLE TOY VEHICLE having a unitary top piece which normally covers the cockpit of the car and is formed by top and side walls, both joined to a rear panel. The rear panel is linked by a pair of flexible racks to a mechanism operatively coupled to the front wheel axle. When the toy vehicle is driven forwardly in the grasp of the user, the rotation of the front wheels rotates the gear coupling to the rack and the convertible top is drawn downwardly and forwardly as it pivots to the interior of the vehicle body.

U.S. Pat. No. 1,973,220 issued to Mohr sets forth a CONVERTIBLE TOY VEHICLE having a pivotable trunk lid, and a pivotably supported convertible top. The trunk lid and convertible top are both pivoted at their rearmost position such that the trunk is pivotable to an open position exposing the trunk interior and the convertible is pivotable about its rear pivot to be placed into the trunk interior in an inverted position. Thereafter the trunk lid is closed.

U.S. Pat. No. 5,055,082 issued to Varner sets forth a CONVERTIBLE TOY in which the appearance of the toy vehicle may be changed substantially. A movable convertible top is included within the vehicle and is pivoted to a retracted position when the appearance is altered from one configuration to another.

U.S. Pat. No. 5,106,150 issued to Litwicki sets forth a ROOF STRUCTURE FOR TOY VEHICLE which includes a pair of upstanding members attached to the end of the vehicle's body. An inverted U-shaped frame having a horizontal cross member is provided on the opposite end of the vehicle's body. A roof panel is pivotally connected at one end thereof between the upstanding members.

U.S. Pat. No. 3,939,605 issued to Allen sets forth a CONTROL OF ACCESSORIES FOR TOY OR MODEL VEHICLES in which a toy or model vehicle includes ground wheels and an articulated simulated engine having movable pistons. A cam mechanism coupled to one wheel is operative to move the engine pistons as the vehicle wheel rotates.

U.S. Pat. No. 3,583,095 issued to Fahrendorff sets forth a TOY VEHICLE ROOF CONSTRUCTION having an inverted U-shaped roll bar mounted at the rear of the passenger compartment and a top extending over the passenger compartment. The top includes clip means on the underside thereof operative and releasable engagement with the roll bar.

U.S. Pat. No. 3,536,345 issued to Ingram sets forth a VEHICLE BODIES having a toy vehicle supporting a multiply articulated linkage and arm supporting frame for a convertible top. The linkage and arm frame is operative to allow the top to be placed in a raised or lowered position.

U.S. Pat. No. 4,083,143 issued to Allen sets forth a CONTROL ARRANGEMENT FOR TOY AND MODEL VEHICLE having a vehicle body supported by rolling wheels. Within the vehicle body a drive mechanism is operative upon a toy figure which extends through an aperture formed in the upper surface of the toy vehicle. A cam formed on the inside of one wheel is operatively coupled to the drive mechanism such that the toy figure rotates or revolves as the vehicle is moved.

U.S. Pat. No. DES. 356,757 issued to Lagaay et al sets forth a SPORTS CAR BODY having a sleek sports car style and a retractable convertible top.

While the foregoing described prior art devices have improved the art, and in some instances enjoyed commercial success, there remains nonetheless a continuing need in the art for evermore improved, interesting and amusing toy vehicles.

SUMMARY OF THE INVENTION

Accordingly, it is a general object of the present invention to provide an improved toy vehicle. It is a more particular object of the present invention to provide an improved toy vehicle having a retractable convertible top. It is a still more particular object of the present invention to provide an improved toy vehicle having a convertible top which is retractable by a battery-powered electric motor drive mechanism.

In accordance with the present invention, there is provided a toy vehicle comprising: a toy vehicle body, an interior, a windshield, and a trunk lid, the trunk lid being pivotable between an open and closed position and having an opening formed therein, a one-piece convertible top supported by the body and pivotable between a raised position and a retracted position, the convertible top defining a curved surface, and battery-powered drive means operative upon the convertible top for pivoting the convertible top between the raised and retracted positions, the convertible top positioned relative to the trunk lid such that pivotal motion of the convertible top causes the convertible top to cam the trunk lid between the open and closed positions.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, and in which:

FIG. 1 sets forth a side elevation view of a toy vehicle constructed in accordance with the present invention having a convertible top in its raised position;

FIG. 2 sets forth a partially sectioned side elevation view of the present invention toy vehicle having a convertible top partially retracted;

DESCRIPTION OF THE PREFERRED EMBODIMENT

Figure 3:
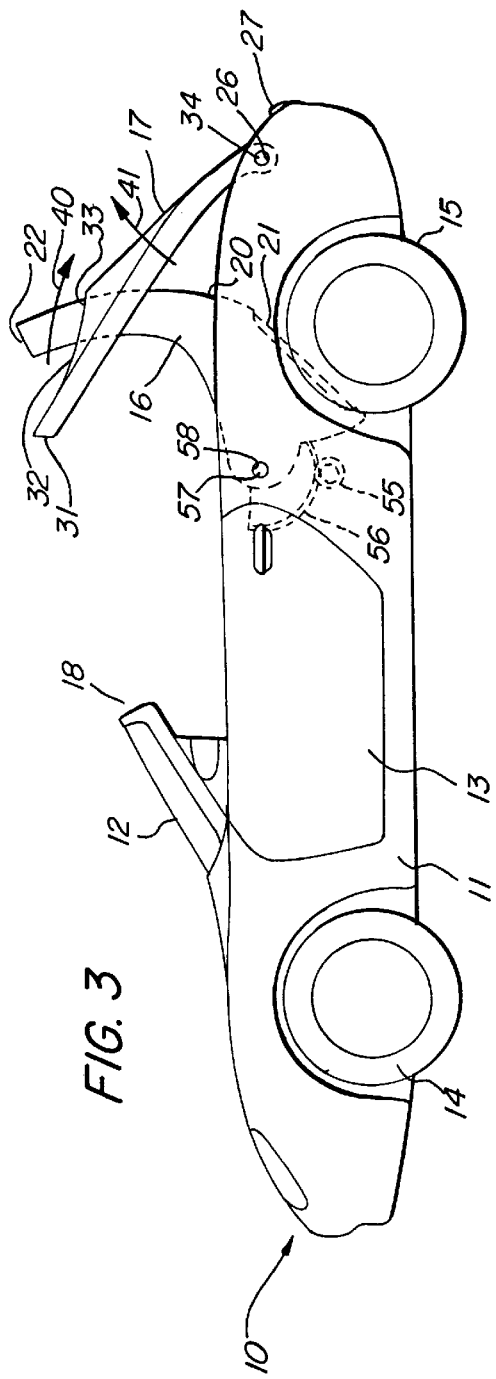
FIG. 3 sets forth a side elevation view of the present invention toy vehicle having the convertible top partially retracted and having the pivotable trunk lid extended upwardly.

FIG. 1 sets forth a side elevation view of a toy vehicle having motor driven convertible top constructed in accordance with the present invention and generally referenced by numeral 10. Toy vehicle 10 includes a body 11 supported by a plurality of rolling wheels such as wheels 14 and 15. Body 11 is preferably formed of a molded plastic material or the like and is generally symmetrical about the toy vehicle center line such that the left side elevation views of toy vehicle 10 shown in FIGS. 1 through 4 are substantially identical to the right hand side of toy vehicle 10 in a mirror image relationship. Thus, while not seen in FIGS. 1 through 4, it will be understood that toy vehicle 10 further includes a second front wheel aligned with wheel 14 and a second rear wheel aligned with wheel 15. Toy vehicle 10 further includes a windshield 12 having a top edge 18 and a door 13 formed in body 11.

Toy vehicle 10 further includes a trunk lid 17 having a pivot pin 34 received within an aperture 26 formed in body 11. In the preferred fabrication of the present invention, trunk lid 17 further defines a second pivot pin substantially identical to pivot pin 34 on the right hand side of the vehicle which in turn is received within a similarly placed aperture (not shown). Trunk lid 17 defines an opening 33 (better seen in FIG. 2) and an edge 32 which encloses opening 33 and is a generally U-shaped edge. Body 11 further defines an aperture 58 which receives a post 57 extending outwardly from the lower portion of convertible top 16. Once again it will be understood that, in the preferred fabrication of the present invention, convertible top 16 and body 11 define a corresponding mirror image post and aperture, respectively, on the right hand side of toy vehicle 10 which is not shown.

Thus trunk lid 17 is pivotable in the manner set forth below about pivot pin 34 while convertible top 16 is pivotable about post 57 seated within aperture 58. Convertible top 16 further defines a front edge 22 which, in the closed position of vehicle 10 shown in FIG. 1, rests against top edge 18 of windshield 12. An on/off button 27 is supported at the rear of vehicle body 11.

Within the interior of body 11, a power drive unit 50 is supported. Power drive unit 50 includes a drive case 51 which supports a motor 52 having an outward gear 53. Power drive unit 50 further includes a gear 54 engaging gear 53 and a gear 55 in a power coupling arrangement. A sector gear 56 is joined to convertible top 16 and is, as a result, also pivotable about post 57 and aperture 58. Sector gear 16 engages gear 55 to complete the power drive to convertible top 16. As is set forth below in FIG. 2 in greater detail, trunk lid 17 is spring biased in its pivotal movement toward the closed position shown in FIG. 1.

In operation, and assuming initially that convertible top 16 is in the raised position shown in FIG. 1, the user presses button 27 which energizes motor 52. As is better seen in FIG. 2, motor 52 is coupled to a battery power source 42 while switch 27 is coupled to battery 42 by means not shown but in accordance with conventional fabrication techniques to provide an on/off switch function. Thus with button 27 pushed, motor 52 is energized rotating gear 53. Gear 53 rotation in turn causes rotation of gears 54 and 55 due to their mutual engagement. Gear 55 also engages sector gear 56 and as a result rotation of gear 55 causes a pivotal or rotational motion of sector gear 56 in the direction indicated by arrow 28. Thus the driving force of motor 52 is coupled through gears 53, 54, and 55 to sector gear 56 pivoting sector gear 56 and more importantly convertible top 16 away from the closed position in FIG. 1 toward the open position shown in FIG. 4. In accordance with an important aspect of the present invention, convertible top 16 is preferably fabricated as a one piece unit having a rigid shape. As a result convertible top 16 is rotated between the open position of FIG. 1 and the closed position of FIG. 4 without the need for apparatus which folds or articulates the different portions of convertible top 16.

FIG. 2 sets forth a partially sectioned side elevation view of toy vehicle 10 during the initial phase of retracting convertible top 16. As set forth above, toy 10 includes a body 11 supported by a plurality of wheels including wheels 14 and 15. Body 11 includes a door 13, a windshield 12 having a top edge 18 and a trunk lid 17. As is also described above, trunk lid 17 is supported by a pivot 30 having a pivot pin 34 received within an aperture 26 (seen in FIG. 1). Trunk lid 17 further includes a curved generally U-shaped edge 32 and an opening 33. Trunk lid 17 further includes a front edge 31 and a post 37. A return spring 36 is received upon pivot pin 34 and engages post 37 and the undersurface of body 11 to provide a return spring force which urges trunk lid 17 in the direction indicated by arrow 38. A switch stop 39 is supported within the interior of body 11 by conventional means (not shown) and is positioned to be contacted by front edge 31 of trunk lid 17 in the closed position shown. In addition, the position of switch stop 39 is selected to define the closed position of trunk lid 17.

Toy vehicle 10 further includes a power drive unit 50 supported within the interior of body 11 having a drive case 51 which supports a motor 52 having an output gear 53. Power drive 50 further includes a gear 54 coupled to and engaging gear 53 together with a gear 55. The latter engages gear 54. As described above, a sector gear 56 is secured to convertible top 16 and is likewise pivotable about post 57. Sector gear 56 engages gear 55 to complete the power coupling between motor 52 and convertible top 16. Also seen in FIG. 2 is a conventional battery 42 having a connector 43 coupled to motor 52 by a plurality of wires 44.

While not seen in FIG. 2, it will be understood that in accordance with conventional fabrication techniques, button switch 27 is coupled to battery 42 in a manner providing an on/off function for power drive 50. Similarly, while not shown in FIG. 2, but in accordance with conventional fabrication techniques, switch stop 39 is coupled to battery 42 to provide an off switch which limits operation of motor 52 when trunk lid 17 is closed upon stop switch 39.

In the position shown in FIG. 2, a cycle of opening convertible top 16 has been initiated and as a result motor 52 begins pivoting sector gear 56 through the coupling of gears 53, 54, and 55. During this time, battery 42 provides operative power to motor 52 through conventional wiring such as wires 44.

Thus as convertible top 16 is pivoted about post 57 in the direction indicated by arrow 25, front edge 22 is separated from top edge 18 of windshield 12. In addition, the rear portion of convertible top 16 including rear window 21 beneath curved surface 20. Thus convertible top 16 begins pivoting downwardly through opening 33 of trunk lid 17 passing edge 32 and extending into the interior of body 11.

In accordance with an important aspect of the present invention, convertible top 16 is brought into contact with edge 32 of trunk lid 17 within opening 33 in the position shown in FIG. 2. Of importance with respect to the operation of the present invention, trunk lid 17 is spring biased to the closed position shown by pivot 30, return spring 36, and post 37. Thus trunk lid 17 urged in a pivotal direction about pivot pin 34 toward the closed position and in the direction indicated by arrow 38. As a result, the continued pivotal movement of convertible top 16 in the direction indicated by arrow 25 forces convertible top 16 against the rear portion of opening 33. The shape of convertible top 16 which includes rear window 21 and curved surface 20 allows convertible top 16 to act as a cam operative against trunk lid 17 to raise the trunk lid as the convertible top continues to pivot.

FIG. 3 sets forth a side elevation view of toy vehicle 10 during the trunk lid opening operation of the convertible top opening cycle. More specifically, toy vehicle 10 includes a body 11 having a windshield 12 which defines a top edge 18. Toy vehicle 10 is supported by a plurality of rolling wheels such as wheels 14 and 15. Body 11 defines a door 13 and supports a push button 27. A pair of apertures 26 and 58 are formed in the left side of body 11. It will be recalled that the right side of toy vehicle 10 is substantially identical to the left side shown in FIG. 3.

Toy vehicle 10 further includes a convertible top 16 having a front edge 32 and a post 57. The latter is received within aperture 58 to provide one side of the pivotal support of convertible top 16. Convertible top 16 is joined to a sector gear 56 which is coupled to motor 52 of power drive unit 50 (seen in FIG. 2) through an intermediate gear 55. To avoid unduly cluttering FIG. 3, power drive unit 50 is omitted from FIG. 3.

Toy vehicle 10 further includes a trunk lid 17 having a pivot pin 34 which is received within an aperture 26 formed in body 11. Once again it will be understood that the right side of vehicle 10 is substantially identical in a mirror image fashion to the left side shown in FIG. 3. Accordingly, in the preferred fabrication of the present invention, trunk lid 17 includes a second pivot pin identical to pivot pin 34 received within a corresponding aperture identical to aperture 26 on the right hand side of toy vehicle 10. Trunk lid 17 further includes a front edge 31, a generally U-shaped edge 32, and an opening 33. As described above, opening 33 is defined by the generally U-shaped character of edge 32.

At the point of operation shown in FIG. 3 which sequentially follows from FIGS. 1 and 2, convertible top 16 has continued rotation from its position in FIG. 2 in the direction indicated by arrow 40. This rotation is caused by the rotation of gear 55 and sector gear 56. As gear 56 is rotated about post 57, rear window 21 and curved surface 20 are forced against the rear portion of opening 33 and edge 32 producing a cam-like effect which in turn overcomes the force of spring 36 to cause trunk lid 17 to be pivoted upwardly in the direction indicated by arrow 41. Thus in accordance with an important aspect of the present invention, the one piece curved shape convertible top provided by convertible top 16 operates as a cam-like member which cams trunk lid 17 upwardly toward an open position as convertible top 16 continues to rotate.

Thereafter the continued rotation of convertible top 16 in the direction indicated by arrow 40 causes trunk lid 17 to be pivoted outwardly in the direction of arrow 48 to a greater and greater degree. As convertible top 16 further rotates in the direction of arrow 40, front edge 22 is forced beneath edge 32 of convertible top 16. The rotation which follows pivots convertible top 16 into body 11 and allows trunk lid 17 to close under the urging of spring 36 (seen in FIG. 2).

Figure 4:
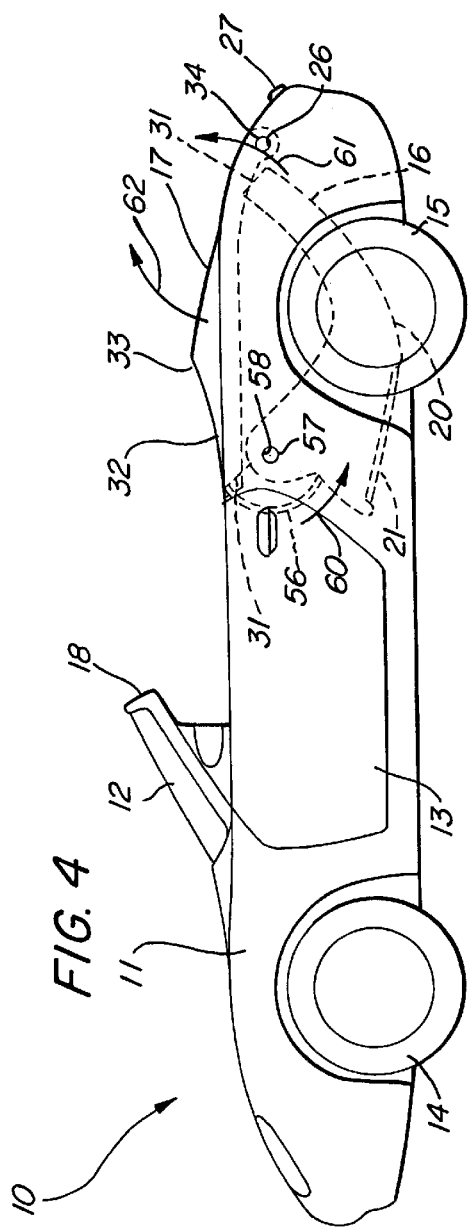
FIG. 4 sets forth a side elevation view of the present invention toy vehicle having the convertible top fully retracted.

FIG. 4 sets forth a side elevation view of toy vehicle 10 at the completion of the above-described process by which convertible top 16 is retracted. More specifically, toy vehicle 10 includes a body 11 having a windshield 12 which defines a top edge 18. Body 11 further includes a door 13 and a pair of apertures 26 and 58. A plurality of rolling wheels such as wheels 14 and 15 support toy vehicle 10 in accordance with conventional fabrication techniques. An on/off button 27 is supported upon body 11 and operative in the above-described manner to initiate a motor drive cycle for convertible top 16. Toy vehicle 10 further includes a trunk lid 17 defining a generally U-shaped edge 32 enclosing an opening 33 together with a front edge 31. As described above, trunk lid 17 is pivotally supported within an aperture 26 by a pivot pin 34 which extends outwardly from trunk lid 17. As is seen in FIG. 2, trunk lid 17 is spring biased toward the closed position shown in FIGS. 1, 2, and 4 by a return spring 36.

In further accordance with the present invention, toy vehicle 10 includes a convertible top 16 having a post 57 received within an aperture 58. The latter is formed in body 11 and supports pivotal motion of convertible top 16. A sector gear 56 is joined to convertible top 16 and as is better seen in FIG. 2, engages power drive 50. Convertible top 16 further defines a curved surface 20 and a rear window 21.

In the position shown in FIG. 4, convertible top 16 is retracted and supported within the interior of body 11. As is also seen in FIG. 4, trunk lid 17 is fully closed.

As a result, toy vehicle 10 is configured in the "top-down" configuration characteristic of convertible vehicles.

Convertible top 16 may be raised to the closed top configuration of FIG. 1 in response to the next operation of button 27. In response to button 27, motor 52 (seen in FIG. 2) is operated in the reverse direction causing corresponding reverse direction rotation of gears 53, 54, and 55. The engagement of sector gear 56 with gear 55 (seen in FIG. 2) causes pivotal movement of sector gear 56 and convertible top 16 in the direction indicated by arrow 60. The pivotal movement of convertible top 16 forces front edge 31 thereof against the undersurface of trunk lid 17. The force exerted by convertible top 16 overcomes the spring biasing force operative upon trunk lid 17 causing trunk lid 17 to begin pivoting upwardly in the direction indicated by arrow 62. Thereafter, as convertible top 16 continues to drive front edge 31 against the undersurface of trunk lid 17 as indicated by arrow 61, trunk lid 17 is correspondingly pivoted toward the position shown in FIG. 3. Once front edge 31 of convertible top 16 passes beyond opening 33, curved surface 20 and rear window 21 act as camming surfaces to slowly allow trunk lid 17 to pivot downwardly toward the closed position shown in FIG. 1. Thereafter, continued rotation of convertible top 16 brings front edge 31 into contact with top edge 18 of windshield 12, thereby completing the top closure cycle.

Thus the present invention toy vehicle provides a motor driven convertible top which operates to either raise or lower a convertible top without the need of multiply articulated pivoting elements typical of other toy vehicles. The apparatus provided makes use of a curved relatively rigid convertible top which is rotated and which provides a cam-like action upon the trunk lid to pivot the trunk lid open and admit the convertible top. The inventive structure is substantially more simple and low cost than prior art attempts at toy vehicle motor driven convertible tops. The aesthetics provided by the closure of the trunk lid to conceal the retracted top substantially improves the overall appearance of the toy vehicle.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy vehicle comprising:
   a toy vehicle body, an interior, a windshield, and a trunk lid, said trunk lid being pivotable between an open and closed position and said trunk lid having an opening and edge formed therein;
   a one-piece convertible top supported by said body and pivotable between a raised position and a retracted position, said convertible top defining a curved outer surface; and
   battery-powered drive means operative upon said convertible top for pivoting said convertible top between said raised and retracted positions,
   said convertible top positioned relative to said trunk lid such that pivotal motion of said convertible top causes said curved outer surface of said convertible top to be forced against said edge of said trunk lid and thereby cam said trunk lid between said open and closed positions.

2. The toy vehicle set forth in claim 1 further including a return spring operative upon said trunk lid and urging said trunk lid toward said closed position.

3. The toy vehicle set forth in claim 2 wherein said curved surface of said convertible is a convex generally continuous curved surface.

4. The toy vehicle set forth in claim 3 wherein said trunk lid defines a rear portion pivotally coupled to said body and an edge at the forward end of said trunk lid which defines said opening.

5. The toy vehicle set forth in claim 4 wherein said battery-powered drive means includes:
   a battery;
   a motor coupled to said battery and having an output gear;
   a sector gear joined to said convertible top so as to pivot therewith; and
   a plurality of intermediate gears engaging and coupling said drive gear and said sector gear.

6. The toy vehicle set forth in claim 5 wherein said vehicle body further supports an on/off switch.

* * * * *